(12) United States Patent
Kwong (10) Patent No.: US 8,582,034 B2
(45) Date of Patent: Nov. 12, 2013

(54) ADAPTIVE SCREEN COLOR CALIBRATION

(75) Inventor: Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 12/211,163

(22) Filed: Sep. 16, 2008

(65) Prior Publication Data

US 2010/0066837 A1    Mar. 18, 2010

(51) Int. Cl.
*H04N 5/57* (2006.01)
*H04N 5/58* (2006.01)
*H04N 17/00* (2006.01)
*H04N 17/02* (2006.01)

(52) U.S. Cl.
USPC .......................................... 348/603; 348/180

(58) Field of Classification Search
USPC ....................................................... 348/603
See application file for complete search history.

(56) References Cited

U.S. PATENT DOCUMENTS

| 5,786,823 A * | 7/1998 | Madden et al. ............... 345/591 |
| 6,172,719 B1 * | 1/2001 | Kim ............................... 348/655 |
| 2004/0196250 A1 * | 10/2004 | Mehrotra et al. ............. 345/102 |
| 2008/0079748 A1 * | 4/2008 | Phan ............................. 345/589 |

* cited by examiner

*Primary Examiner* — Jefferey Harold
*Assistant Examiner* — Michael Teitelbaum
(74) *Attorney, Agent, or Firm* — Lynch Law Patent Group, P.C.

(57) ABSTRACT

Various embodiments for adaptive screen color calibration are presented. An embodiment of a method includes activating a calibration feature on a device, obtaining color data by scanning a pre-set color pattern displayed on a screen via a RGBW color sensor in the device, obtaining a current ambient light condition via an ambient light sensor in the device, obtaining a current temperature condition via a temperature sensor and measuring the color data with the current ambient light condition and current temperature condition, where the measured color data is used to automatically adjust one or more color settings of the screen to match a pre-set color standard. Other embodiments are described and claimed.

16 Claims, 4 Drawing Sheets

ADAPTIVE SCREEN COLOR CALIBRATION

BACKGROUND

The importance for a device provider (e.g., a consumer electronics provider) to continuously strive to improve the features of its products cannot be overstated. For example, it is important to many consumers to have access to a television or display that is capable of reproducing color on its screen with high accuracy as it relates to real life color space for broadcast television, and so forth. While the ability to reproduce color with high accuracy is particularly desirable for digital televisions or displays, the desirability applies to all types of display technologies including, but not necessarily limited to, liquid crystal display (LCD), plasma, organic light-emitting diode (OLED), cathode-ray tube (CRT), projector, and so forth.

However, there are limitations to televisions or displays being able to reproduce color with high accuracy on their screens. For example, television/display screens need to periodically undergo calibrations for accurate color reproduction to match the real life color space or a pre-set color standard. Here, color depth, brightness, contrast, and hue color settings are all required to be calibrated to match the preset standard. In addition, environmental lighting conditions and/or temperature conditions may affect screen color viewing quality.

DETAILED DESCRIPTION

Embodiments of the present invention provide techniques for adaptive screen color calibration. Here, in embodiments, a television or display is capable of reproducing color on its screen with high accuracy as it relates to real life color space for broadcast television, for example. In embodiments, a remote control or handheld device incorporates an embedded RGBW color sensor to scan a pre-set or current color pattern displayed on a screen of a television/display. The device may also incorporate an embedded ambient light sensor to determine the current ambient light conditions in the environment. The device may also incorporate an embedded temperature sensor to determine the current temperature conditions in the environment. The device incorporates a color measuring module that measures the color data of the scanned pattern with the current ambient light condition and/or temperature. The device then forwards the measured color data to the television/display. A calibration module of the television/display uses the measured color data to automatically adjust its screen color setting to match a pre-set color standard (e.g., Pantone color standard). Such adjustments may be to the color depth, brightness, contrast, and hue color settings, for example. As the current ambient light condition in the environment changes, the calibration module continues to monitor the current ambient light condition via an ambient light sensor. Likewise, as the current temperature condition changes, the calibration module may continue to monitor the temperature via a temperature sensor. The calibration module uses the changed ambient light condition and/or changed temperature condition to adapt or re-calibrate the screen color as needed to match the pre-set color standard.

Embodiments of the invention may be used to alleviate aging challenges for display technologies by re-calibrating the screen color for each type of screen display as needed to ensure that each of the displays maintains real life color space with high accuracy. The re-calibration may be done automatically by the television or display. The user may also be prompted to reactivate the calibration feature on remote control or handheld device, if necessary. Other embodiments may be described and claimed.

Various embodiments may comprise one or more elements or components. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
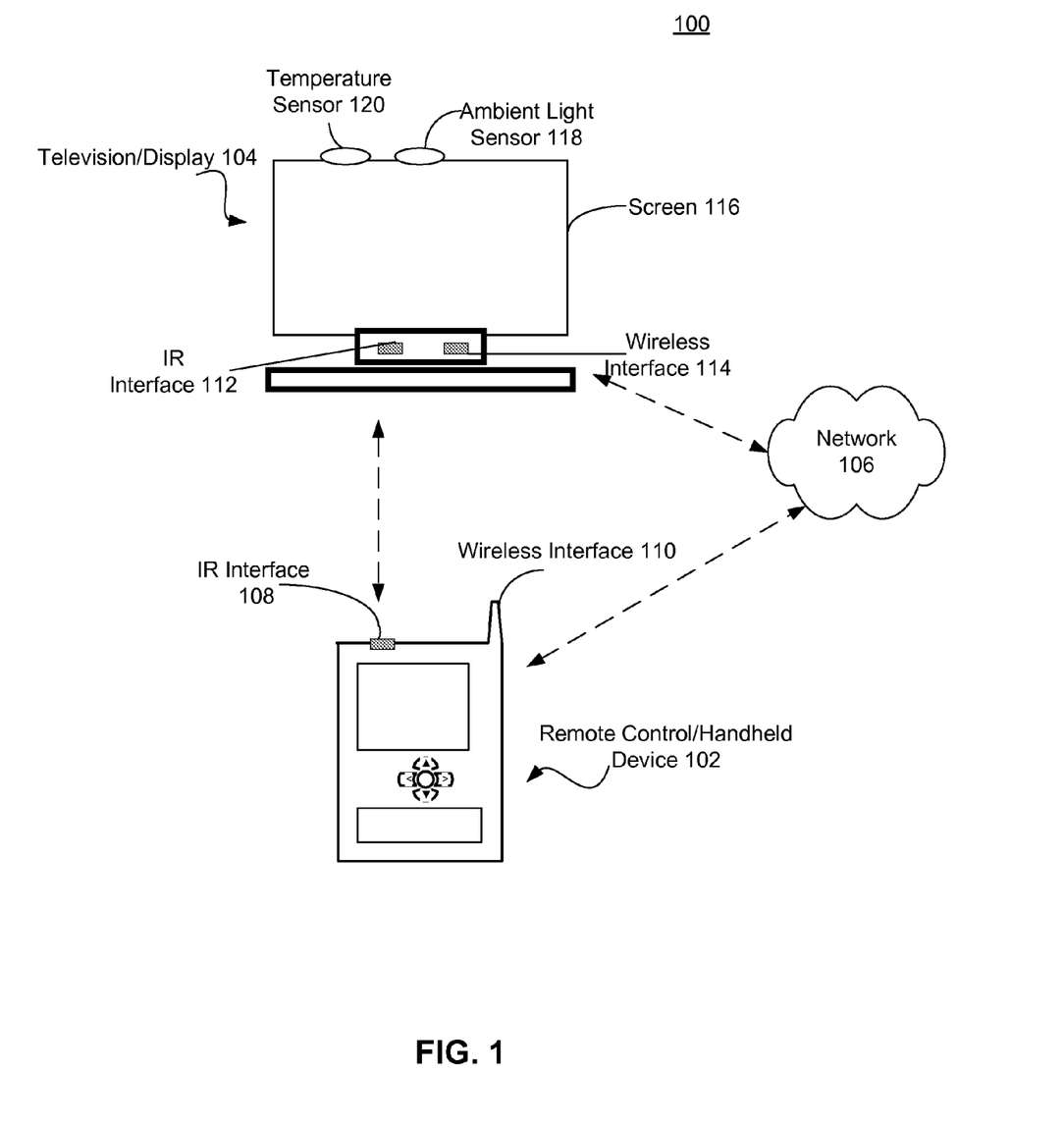
FIG. 1 illustrates one embodiment of a system.

FIG. 1 illustrates one embodiment of a system 100 for adaptive screen color calibration. In one embodiment, system 100 comprises a remote control or handheld device 102, a television or display 104 and a network 106. Device 102 may include an infra-red (IF) interface and/or a radio or wireless interface 110. As will be described below with reference to FIG. 2, device 102 may also include a RGBW color sensor, an ambient light sensor, a temperature sensor, a calibration button and a color measuring module. Television/display 104 may include an IR interface 112 and/or a radio or wireless interface 114, a screen 116, an ambient light sensor 118 and a temperature sensor 120. As will be described below with reference to FIG. 3, television/display 104 may also include a calibration module.

At a high level and in an embodiment, it is desirable for screen 116 to produce color for its displayed image with high accuracy as it relates to real life color space for broadcast television, for example. Unfortunately, varying conditions in the environment, such as ambient light conditions and temperature conditions, may change the accuracy of the displayed color as it is viewed by a user. In addition, may types of screen or display technologies require the screen to periodically undergo calibrations for accurate color reproduction to match the real life color space or a pre-set color standard. Here, one or more of color depth, brightness, contrast, and hue color settings may need to be calibrated or adjusted to match the preset standard.

In embodiments, a user may use remote control or handheld device 102 to activate a calibration feature. When the calibration feature is activated, screen 116 will display an image in a pre-set color pattern. The image may be text, graphics, video, and so forth. Device 102 is used to scan the image currently being displayed on screen 116 via its RGBW color sensor. Device 102 may also be used to collect data on the current ambient light condition in the environment via its ambient light sensor. Device 102 may also be used to collect data on the current temperature condition in the environment via its temperature sensor. Device 102 then measures the color data of the scanned pattern with the current ambient light condition and/or temperature condition via the color measuring module. Device 102 transmits the measured color data to the television or display 104.

The calibration module of television or display 104 uses the measured color data to automatically adjust its screen color setting to match a pre-set color standard (e.g., Pantone color standard). Here, such adjustments may include adjustments to the color depth, brightness, contrast, and hue color settings, for example. The calibration module continues to monitor for any changes in the ambient light condition via ambient light sensor 118 and/or any changes in the temperature condition in the environment via temperature sensor 120 and automatically adapts or re-calibrates the screen color settings as needed to match the pre-set color standard. In addition, the calibration module may request that the user reactivate the calibration feature with remote control or handheld device 102.

There are various ways in which device 102 and television or display 104 may communicate with each other. In an embodiment, device 102 may be a remote control device that is adapted to include functionalities of the present invention as is described herein. Here, device 102 may encode the measured color data into, for example, an infra-red signal, such as one generated by a typical remote control device, to transmit the measured color data to television or display 104. Using infra-red signals to encode the measured color data may alleviate the need for wireless capabilities in handheld device 102 and/or television or display 104. In other embodiments, device 102 may have wireless capabilities where the measured color data is transmitted to television or display 104 via network 106 (e.g., the Internet, a local area network (LAN), a wide area network (WAN), etc.).

As described above, in embodiments, the calibration module may request that the user activate or reactivate the calibration feature with remote control or handheld device 102. In embodiments where the calibration module sends the request to device 102, device 102 is adapted to facilitate two-directional communication. Here, device 102 can send information/requests to the television or display 104 and may also receive information/requests from television or display 104 via one or more communication means. Likewise, in embodiments, television or display 104 may be adapted to facilitate two-directional communication. Here, television or display 104 can send information/requests to the device 102 and may also receive information/requests from device 102 via one or more communication means. For example, in embodiments, one or both of IR interfaces 108 and 112 may be two-directional and thus may receive and send information/requests. Likewise, one or both of wireless interfaces 110 and 114 may be two-directional and thus may receive and send information/requests. In another example, device 102 facilitates two-directional communication by sending information/requests to television or display 104 via IR interface 108 to IR interface 112, but receives information/requests from television or display 104 via their wireless interfaces 110 and 114. Embodiments of the invention are not limited in this context. In fact, embodiments of the invention provide for device 102 and/or television or display 104 to communicate via any applicable means.

In one embodiment, device 102 may be any handheld device capable of performing the functionality of the invention described herein. Device 102 may be implemented as part of a wired communication system, a wireless communication system, an infra-red system, or a combination thereof. In one embodiment, for example, device 102 may be implemented as a mobile computing device having wireless or infra-red capabilities. A mobile computing device may refer to any device which can be easily moved from place to place. In embodiments, the mobile computing device may include a processing system.

As described above, an embodiment of the invention provides for handheld device 102 to be a typical remote control device adapted to include the functionality of the invention. Other embodiments of device 102 may include any handheld device that is adapted to include the functionality of the present invention, including but not necessarily limited to, a mobile internet device (MID), smart phone, handheld computer, palmtop computer, personal digital assistant (PDA), cellular telephone, combination cellular telephone/PDA, pager, one-way pager, two-way pager, messaging device, data communication device, and so forth.

As described above, the measured color data is used by television/display 104 to automatically adjust its screen color settings to match a pre-set color standard (e.g., Pantone color standard). In embodiments, device 102 transmits the measured color data to television/display 104 in real time. In other embodiments, device 102 may also be adapted to store real-time data via integrated long term storage, such as flash memory for example, and then transmit the data to television/display 104 at a later time. The integrated long term storage helps to ensure that no data are lost if the connection between device 102 and television/display 104 is temporarily unavailable.

In various embodiments, system 100 may be implemented as a wireless system, a wired system, an infra-red system, or a combination thereof. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Embodiments of the invention provide for a way of ensuring that two or more screens with different technologies maintain the same or similar capabilities of reproducing color on their screens with high accuracy as it relates to real life color space. Different display technologies experience different aging challenges. For example, a screen with OLED technology must compensate fading blue pixels after the OLED display has been used for a number of hours to maintain the high accuracy of real life color on its screen. Here, red and green pixels out last the blue pixels and thus requires the OLED display to undergo periodic calibration to maintain the display's true color. Accordingly, embodiments of the invention as described herein may be used to alleviate aging challenges for display technologies by re-calibrating the screen color for each type of screen display as needed to ensure that each of the displays maintains real life color space with high accuracy. The re-calibration may be done automatically by the television or display 104. The user may also be prompted to reactivate the calibration feature on remote control or handheld device 102, if necessary.

Embodiments of the invention provide for a way of calibrating multiple screens with a mobile work station, where the mobile work station is adapted to include the functionality of the invention as described herein. For example, a second display may slide onto the back of a main display of the mobile work station. Here, remote control or handheld device 102 is placed at the back of the main display facing the second display while the second display is in a close/stow position. After calibrating the second display, the user can slide the second display out and use it.

Embodiments of the invention provide for a way of ensuring that a screen of a display or television is capable of producing real life color space with high accuracy while the display is warming up. For example, many types of display technologies require a warm-up period for the display to fully produce its pre-set color pattern on the screen. Embodiments of the invention as described herein may be used to calibrate the color for the screen to display real life color space with high accuracy while it is warming up.

Figure 2:
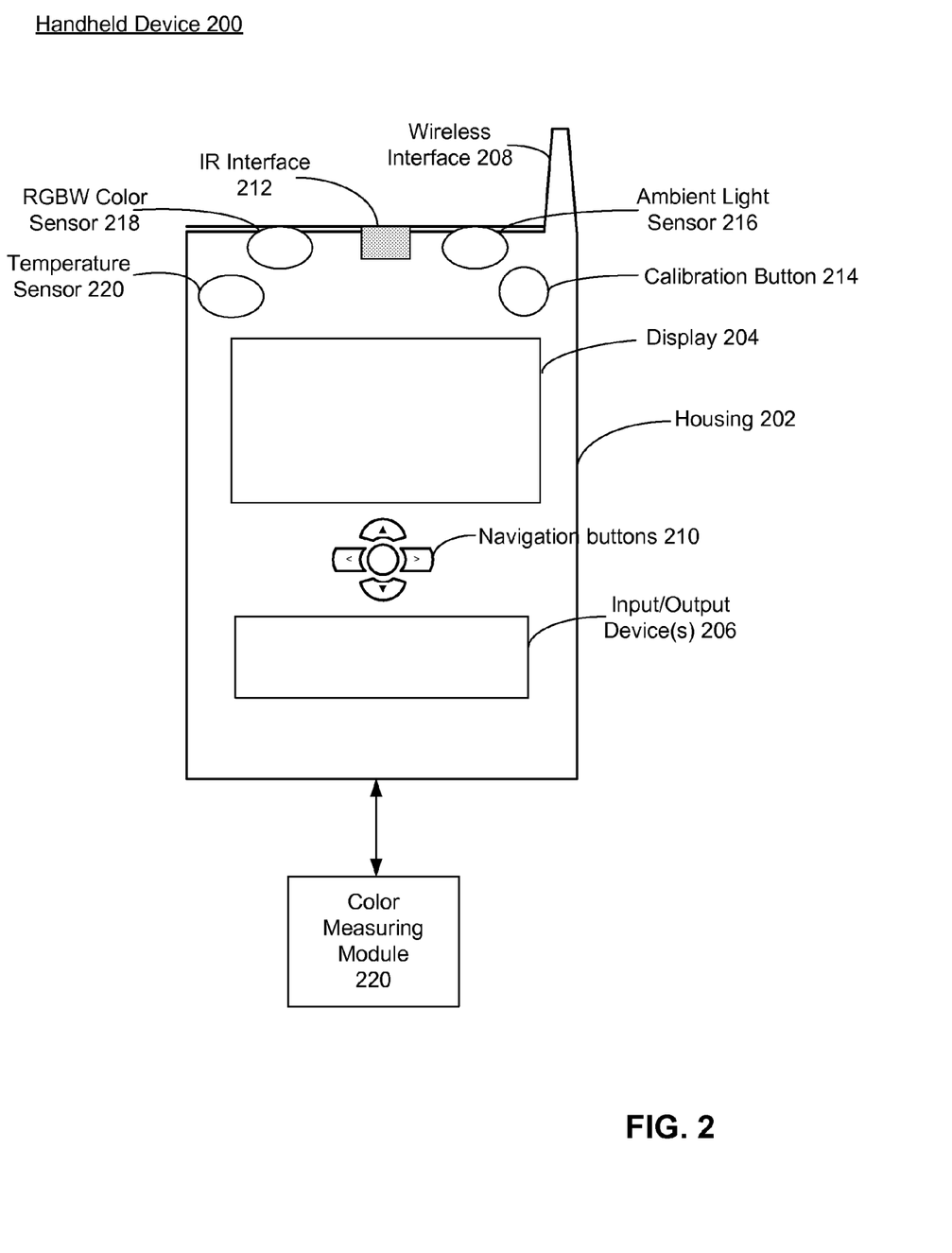
FIG. 2 illustrates one embodiment of an apparatus.

A more detailed description of an embodiment of the remote control or handheld device is shown in FIG. 2. Referring to FIG. 2, device 200 may include a housing 202, a display 204, one or more input/output devices 206, an antenna or wireless interface 208, navigation buttons 210, an infra-red (IR) interface 212, a calibration button 214, an ambient light sensor 216, a RGBW color sensor 218, a color measuring module 220 and a temperature sensor 220. Sensors 216, 218 and 220 and module 220 may be directly integrated into device 200 or may be coupled to device 200 via a connection (e.g., wireless, wired or some combination of both). Each of the components of FIG. 2 is described next in more detail.

Housing 202 may comprise any suitable housing, but typically involves a small form factor to enable device 200 to be easily held and transportable.

Display 204 may comprise any suitable display unit for displaying information appropriate for a handheld device. Display 204 may be used by the invention to display customized information to the user, customized user interfaces, to assist with input into device 200 (e.g., user-specific commands like how to position device 200 to better scan the pre-set color pattern currently displayed on a screen, etc.), and so forth.

I/O device(s) 206 may comprise any suitable I/O device for entering information into and receiving information from device 200. Examples for I/O device(s) 206 may include typical remote control device controls, touch screen interfaces, simple menus with icon selection, gestural manipulation of the device, a suitable alphanumeric keyboard, a numeric keypad, a touch pad, input keys, buttons, switches, rocker switches, a microphone, a speaker, voice recognition device and software, and so forth. The embodiments are not limited in this context.

In one embodiment, navigation buttons 210 comprise an upward navigation button, a downward navigation button, a leftward navigation button, and a rightward navigation button. Navigation buttons 210 also may comprise a select button to execute a particular function on device 200.

As described above, wireless interface or antenna 208 and/or IR interface 212 may be used to facilitate communication with a television/display (such as television/display 104 from FIG. 1). Although device 200 is illustrated in FIG. 2 as having both wireless interface 208 and IR interface 212, this is not meant to limit embodiments of the invention. Embodiments may include only one of or both of wireless interface 208 and IR interface 212, or some other means of communication.

In embodiments, calibration button 214 may be activated by a user to initiate the calibration feature or function of the invention as described herein. In other embodiments, the calibration feature may automatically be activated when handheld device 200 is used to turn on the television or display, for example.

As also described above, RGBW color sensor 218 is used to scan the image currently being displayed on a screen. Ambient light sensor 216 is used to collect data on the current ambient light condition in the environment. Temperature sensor 220 is used to collect data on the current temperature condition in the environment. Color measuring module 220 then measures the color data of the scanned pattern with the current ambient light condition and/or temperature condition. The measured color data is transmitted to the television/display via IR interface 212 or wireless interface 208, for example.

In other embodiments, the functionality of color measuring module 220 may be done in the television or display. Here, for example, the collected data for the scanned color data may be sent to the television or display and a color measuring module in the television/display measures the scanned color data with the current ambient light condition and/or temperature condition.

Figure 3:
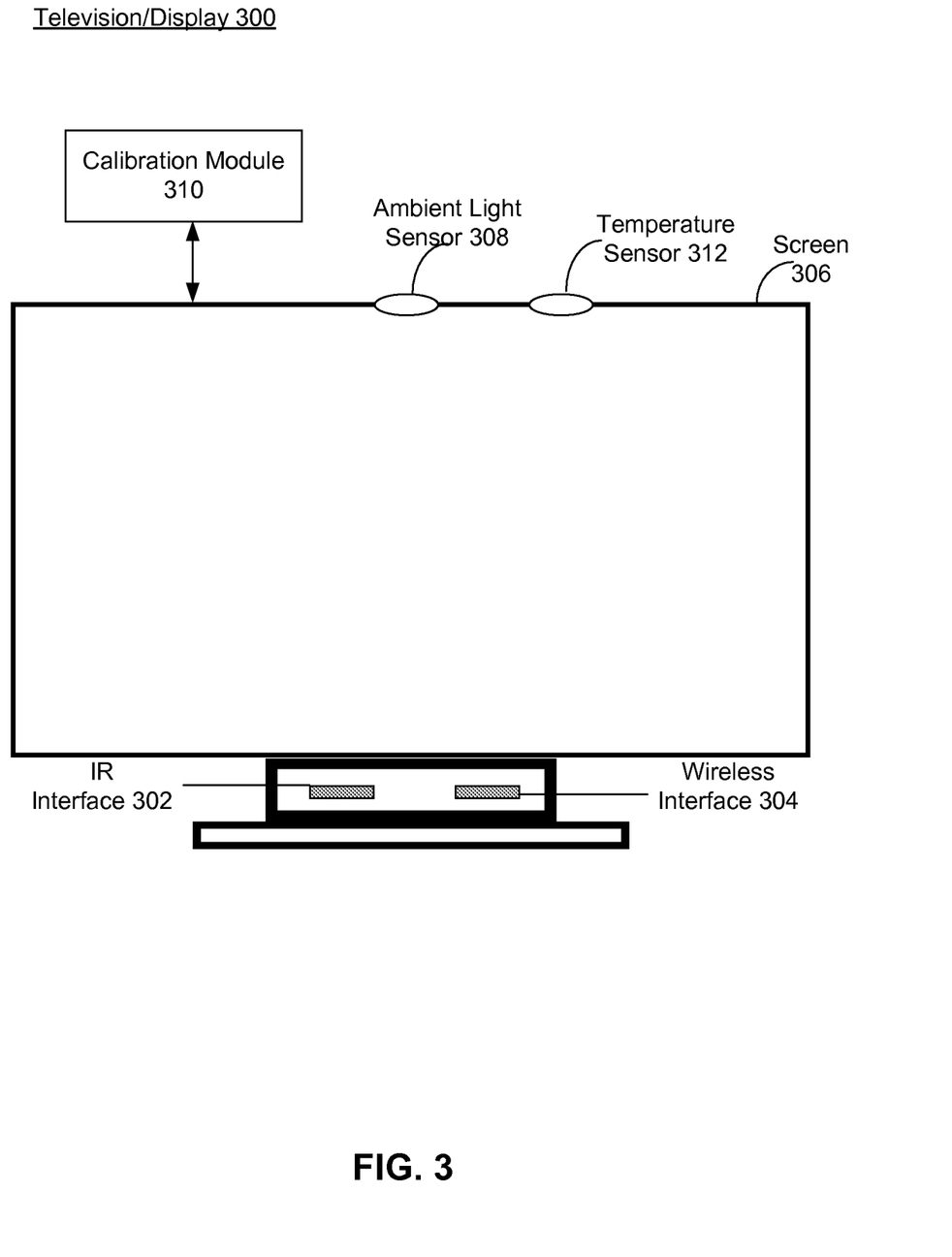
FIG. 3 illustrates one embodiment of an apparatus.

A more detailed description of an embodiment of the television or display is shown in FIG. 3. Referring to FIG. 3, television/display 300 may include an IR interface 302, a wireless interface 304, a screen 306, an ambient light sensor 308, a calibration module 310 and a temperature sensor 312. Sensors 308 and 312 and module 310 may be directly integrated into television/display 300 or may be coupled to television/display 300 via a connection (e.g., wireless, wired or some combination of both).

In embodiments, television/display 300 may include a digital display. In other embodiments, the display may be of another type of technology including, but not necessarily limited to, liquid crystal display (LCD), plasma, organic light-emitting diode (OLED), cathode-ray tube (CRT), projector, and so forth.

In embodiments, calibration module 310 is implemented as firmware. In other embodiments, calibration module 310 is implemented as software, firmware, or hardware, or some combination thereof.

In embodiments, wireless interface 304 and/or IR interface 302 may be used to facilitate communication with a remote control or handheld device. Although device 300 is illustrated in FIG. 3 as having both wireless interface 304 and IR interface 302, this is not meant to limit embodiments of the invention. Embodiments may include only one of or both of wireless interface 304 and IR interface 302, or some other means of communication.

As described above, calibration module 310 uses the measured color data transmitted from the remote control or handheld device to automatically adjust its screen color settings to match a pre-set color standard (e.g., Pantone color standard). As the current ambient light condition and/or temperature condition in the environment changes, calibration module 310 continues to monitor the current ambient light condition via ambient light sensor 308 and temperature condition via temperature sensor 312 and re-calibrates the screen color as needed to match the pre-set color standard without any user intervention.

In embodiments, calibration module 310 may determine that the calibration feature via the remote control or handheld device is needed and request that the user activate the calibration feature. For example, some display technologies may require a re-calibration more frequently than other display technologies in order to maintain the high accuracy of real life color on its screen. Here, calibration module 310 may request a re-calibration from the user on a periodic basis, depending on the display technology. In embodiments, the request may be accomplished by visually displaying the request on screen 306 or through audio via speakers associated with television or display 300, for example. In other embodiments, television or display 300 may send the request to the remote control or handheld device to be delivered to the user. For example, in embodiments, IR interface 302 may act as a receiver. But, in other embodiments, IR interface 302 may be a two-directional IR interface. In addition, the remote control or handheld device may include a two-directional IR interface. Here, the request may be sent to remote control or handheld device via two-directional IR interface 302 to be either displayed on a screen of the remote control or handheld device or through audio via speakers associated with the remote control or handheld device. Embodiments of the invention are not limited in this context.

In embodiments, calibration module 310 may allow the user to pick different International Color Consortium (ICC) profiles and, based on the selected profile, adjust the frequency of the automatic re-calibration by calibration module 310 itself, as well as the frequency of the calibration feature requested from the user via the remote control or handheld device. For example, different profiles may be specified for displaying DVD video, video games, different television standards, digital pictures, and so forth. In embodiments, calibration module 310 may allow the user to select one or more personal color settings and, based on the selected color settings, adjust the frequency of the automatic re-calibration by calibration module 310 itself, as well as the frequency of the calibration feature requested from the user via the remote control or handheld device.

In embodiments, calibration module 310 may also maintain user profiles in order to customize the pre-set color standard to which it automatically adjusts its screen color settings. For example, assume that a specific user is identified to calibration module 310. Further assume that calibration module 310 has already adjusted the screen color settings (e.g., color depth, brightness, contrast, hue color settings, etc.) to match the pre-set color standard. If the user at this point customizes or makes further adjustments to any of the color depth, brightness, contrast, hue color settings, etc., then calibration module 310 may save these customization adjustments in a user profile for the identified user. In this way, calibration module 310 may customize the pre-set color standard to better suit the preferences of the identified user and thereby alleviate the user from having to make the manual customization adjustments in the future. Embodiments of the invention are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 4:
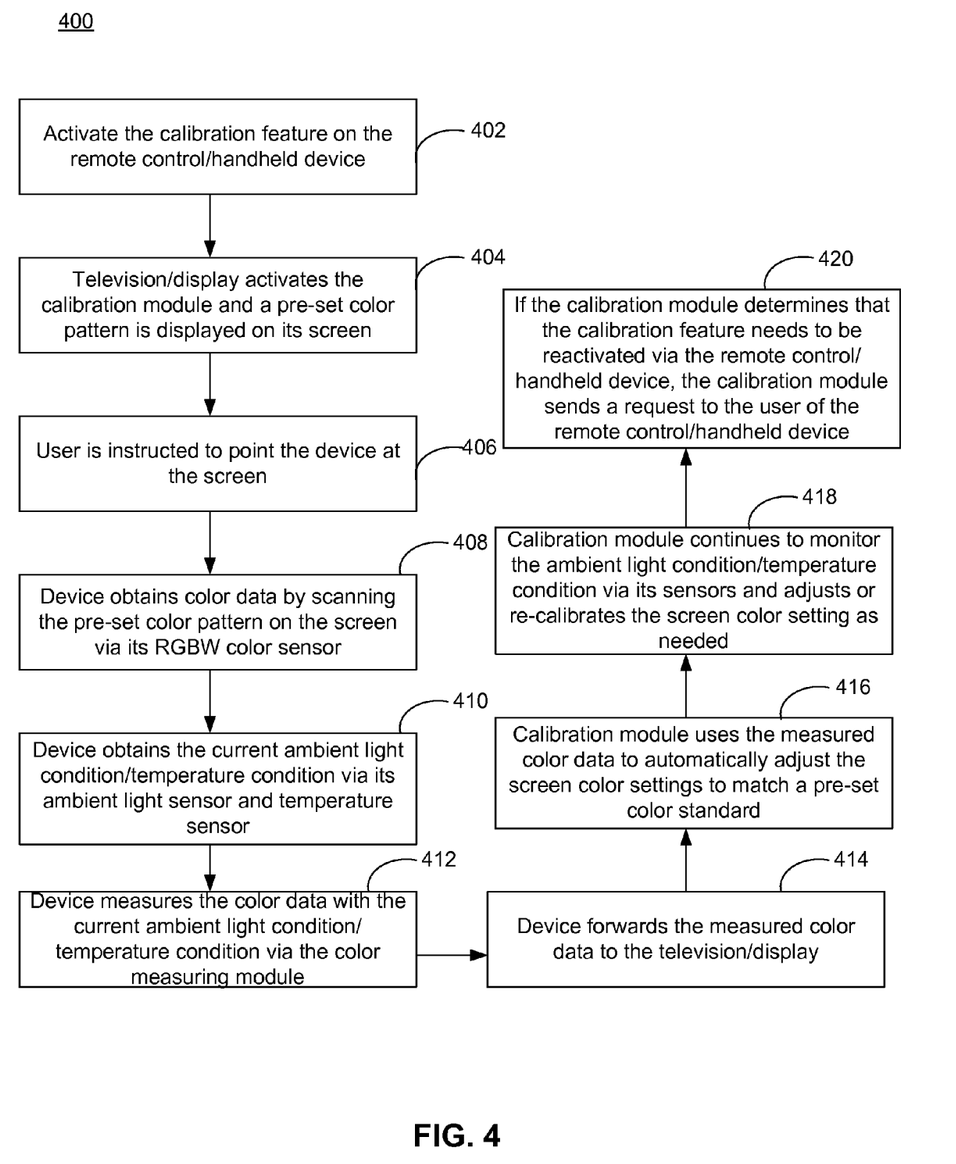
FIG. 4 illustrates one embodiment of a logic flow.

FIG. 4 illustrates one embodiment of a logic flow 400. The logic flow 400 may be representative of the operations executed by one or more embodiments described herein, for example, the operations executed by system 100.

Referring to FIG. 4, the calibration feature on the remote control or handheld device is activated, as described above (block 402). In response, the television or display activates the calibration module and a pre-set color pattern is displayed on its screen (block 404). The user is instructed to point the device at the screen (block 406). The remote control or handheld device obtains color data by scanning the pre-set color pattern on the screen via its RGBW color sensor (block 408). The remote control or handheld device obtains the current ambient light condition via its ambient light sensor and/or current temperature condition via its temperature sensor (block 410).

The remote control or handheld device measures the color data with the current ambient light condition and/or temperature condition via the color measuring module (block 412). The remote control or handheld device forwards the measured color data to the television or display (block 414).

The calibration module of the television or display uses the measured color data to automatically adjust the screen color settings to match a pre-set color standard (block 416). The calibration module continues to monitor the ambient light condition and/or temperature condition via its sensors and automatically adjusts or re-calibrates the screen color settings as needed (block 418). If the calibration module determines that the calibration feature needs to be reactivated via the remote control or handheld device, the calibration module sends a request to the user of the remote control or handheld device (block 420).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable or computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium, computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    activating a calibration feature on a remote control device;
    obtaining color data by scanning a pre-set color pattern displayed on a screen of a display device via a RGBW color sensor in the device;
    obtaining, via the remote control device, a current ambient light condition via an ambient light sensor in the device;
    obtaining, via the remote control device, a current temperature condition via a temperature sensor in the device;
    measuring, via the remote control device, the color data with the current ambient light condition and current temperature condition;
    receiving, via the display device, from the remote control device, the measured color data;
    using, via the display device, the measured color data to adjust one or more screen color settings to match a pre-set color standard, wherein the display device includes a color sensor to generate the measured color data and an ambient light sensor to generate the ambient light condition data;
    monitoring, via the display device, the ambient light condition for changes;
    monitoring, via the display device, the temperature condition for changes; and
    if one or both of the ambient light condition and temperature condition changes, then re-calibrating, via the display device, the one or more screen color settings to match the pre-set color standard based on the changed ambient light condition or changed temperature condition.

2. The method of claim 1, wherein the device includes an infra-red (IR) interface used to forward the measured color data to the screen.

3. The method of claim 2, wherein the screen is included in a television.

4. The method of claim 1, wherein the device is a handheld device that includes a wireless interface used to forward the measured color data to the screen.

5. A system, comprising:
    a remote control device, the remote control device comprising:
        a color measuring module;
        a RGBW color sensor;
        an ambient light sensor; and
        a temperature sensor,
        wherein the remote control device is capable of obtaining color data by scanning a pre-set color pattern displayed on a screen via the RGBW color sensor, obtaining a current ambient light condition via the ambient light, obtaining a current temperature condition via the temperature sensor and measuring the color data with the current ambient light condition and current temperature condition via the color measuring module; and
    a display device, the display device comprising:
        a calibration module;
        a display screen;
        a second ambient light sensor; and
        a second temperature sensor,
        wherein the display device is adapted to display a pre-set color pattern on the screen in response to a calibration feature being activated by the remote control device, wherein the display device s is adapted to receive measured color data from the remote control device, and wherein the display device is adapted to use the measured color data to adjust one or more screen color settings to match a pre-set color standard,
        wherein the display device s is adapted to monitor the ambient light condition for changes via the second ambient light sensor, to monitor the temperature condition for changes via the second temperature sensor and if one or both of the ambient light condition and temperature condition changes, then re-calibrate the one or more screen color settings to match the pre-set color standard based on the changed ambient light condition or changed temperature condition.

6. The system of claim 5, wherein the remote control device further includes an infra-red (IR) interface used to forward the measured color data to the screen.

7. The system of claim 6, wherein the screen is included in a television.

8. The system of claim 5, wherein the remote control device is a handheld device that includes a wireless interface used to forward the measured color data to the screen.

9. A method, comprising:
    displaying, via a display device, a pre-set color pattern on a screen in response to a calibration feature being activated;

receiving, via the display device, from a remote control device, measured color data, wherein the measured color data includes data on the pre-set color pattern, data on an ambient light condition and data on a temperature condition;

using, via the display device, the measured color data to adjust one or more screen color settings to match a pre-set color standard, wherein the display device includes a color sensor to generate the measured color data and an ambient light sensor to generate the ambient light condition data;

monitoring, via the display device, the ambient light condition for changes;

monitoring, via the display device, the temperature condition for changes; and if one or both of the ambient light condition and temperature condition changes, then re-calibrating, via the display device, the one or more screen color settings to match the pre-set color standard based on the changed ambient light condition or changed temperature condition.

10. The method of claim 9, wherein the pre-set color standard is the Pantone color standard.

11. An apparatus, comprising:
a calibration module;
a display screen,
an ambient light sensor; and
a temperature sensor,
wherein the apparatus is adapted to display a pre-set color pattern on the screen in response to a calibration feature being activated by a remote control device, wherein the apparatus is adapted to receive measured color data from the remote control device, wherein the measured color data includes data on the pre-set color pattern, data on an ambient light condition and data on a temperature condition, wherein the remote control device includes a color sensor to generate the measured color data and a second temperature sensor to generated the data on the temperature condition and a second ambient light sensor to generate the ambient light condition data, and wherein the apparatus is adapted to use the measured color data to adjust one or more screen color settings to match a pre-set color standard, wherein the apparatus is adapted to monitor the ambient light condition for changes via the ambient light sensor, to monitor the temperature condition for changes via the temperature sensor and if one or both of the ambient light condition and temperature condition changes, then re-calibrate the one or more screen color settings to match the pre-set color standard based on the changed ambient light condition or changed temperature condition.

12. The apparatus of claim 11, wherein the apparatus is a television.

13. The apparatus of claim 11, wherein the pre-set color standard is the Pantone color standard.

14. The apparatus of claim 11, wherein the apparatus is a display and the remote control device is a handheld device.

15. A non-transitory computer storage medium containing instructions which, when executed by a processing system, cause the processing system to perform instructions for:

displaying, via a display device, a pre-set color pattern on a screen in response to a calibration feature being activated;

receiving, via the display device, from a remote control device, measured color data, wherein the measured color data includes data on the pre-set color pattern, data on an ambient light condition and data on a temperature condition;

using, via the display device, the measured color data to adjust one or more screen color settings to match a pre-set color standard, wherein the device includes a color sensor to generate the measured color data and an ambient light sensor to generate the ambient light condition data;

monitoring, via the display device, the ambient light condition for changes;

monitoring, via the display device, the temperature condition for changes; and if one or both of the ambient light condition and temperature condition changes, then re-calibrating, via the display device, the one or more screen color settings to match the pre-set color standard based on the changed ambient light condition or changed temperature condition.

16. The non-transitory computer storage medium claim 15, wherein the pre-set color standard is the Pantone color standard.

* * * * *